Feb. 2, 1932.  E. G. ROMEISER  1,843,837
ELECTRIC WIRE CONDUIT
Filed March 2, 1931
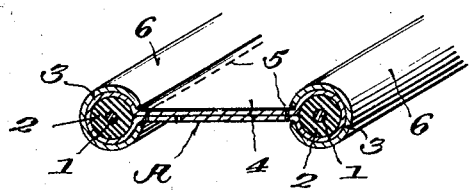
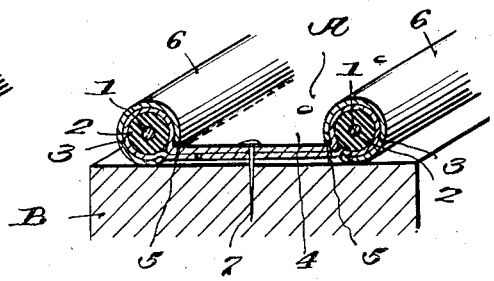
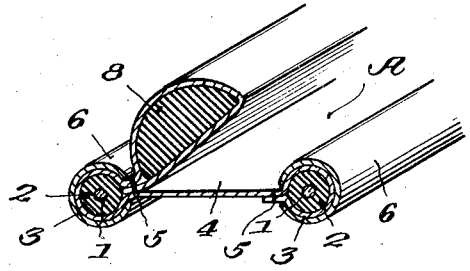
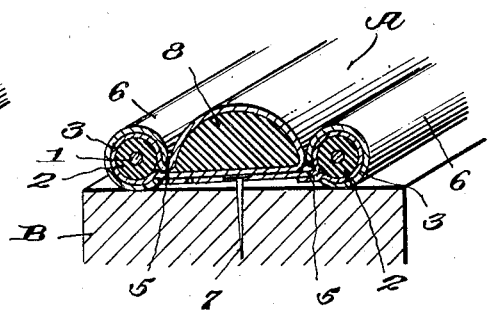
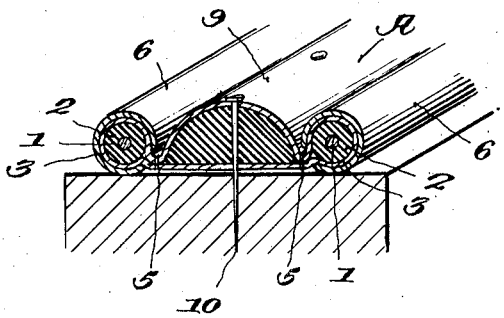
Inventor
Ernest G. Romeiser
By Dyve & Kirchner
Attorneys Patented Feb. 2, 1932

1,843,837

UNITED STATES PATENT OFFICE

ERNEST G. ROMEISER, OF UNION CITY, INDIANA

ELECTRIC WIRE CONDUIT

Application filed March 2, 1931. Serial No. 519,665.

My invention relates to electric wire conduits, and particularly to insulated electric current conductors adapted to be used in interior installations.

A particular type of conduit to which my present invention is especially adapted comprises an electric conducting wire or a plurality of such wires, each provided with an insulating covering and an area adapted to receive tacks or similar fastening means for securing the conduit to a support. The wire coverings are generally formed of paper, textile fabric or similar material with jackets of rubber or its compounds immediately surrounding the wires themselves. The supports to which these conduits are frequently secured are commonly the interior walls, floors and ceilings of rooms and the like in dwelling houses and other buildings, and when a run of the conduit is installed in the lower zone of an interior, as for example along the baseboard, wainscoting, or lower part of the wall of a room, the conduit becomes subject to injury from accidental blows by the feet of persons, the legs of chairs and other articles of furniture, vacuum cleaners and other floor cleaning instrumentalities, and from a variety of other causes.

It will be appreciated that the appearance of a conduit used in interior installations is important, and that injuries thereto are objectionable insofar as the resulting defacement of the covering material detracts from the neat and attractive appearance originally presented by the conduit. It is an object of the present invention to provide a conduit of the type indicated with means for preventing such injuries.

In addition to the impaired appearance of the conduit, the causes suggested hereinabove frequently operate to bring about functional defects in the conduit by removing a portion of the wire insulation and exposing the wires. Serious damage has been caused by short circuits resulting from wires so exposed. A further primary object of the present invention is to provide a conduit having means to prevent such injuries.

To accomplish the foregoing and other objects and advantages which will be more apparent as the description proceeds my invention contemplates providing the conduit with a sheath or covering, preferably of metal, for the protection of the current carrying wires and their insulating jackets. A feature of the invention resides in the provision of separate and electrically unconnected metal coverings for each of the wire carrying jackets.

In certain particular and preferred forms of embodiment the invention contemplates the combination of a relatively pliable and flexible body provided with electric conductor wires and having independent metallic protecting sheaths jacketed over each of the wires and preferably secured against movement with relation to the body, so that the combination of wires, body and sheaths assembled complete when the structure is manufactured forms a unitary organization not likely to become disassembled under ordinary conditions of use.

In the accompanying drawings which form part of this application for Letters Patent and in which the same reference character is used to designate the same part in the several views, Each of the figures is a perspective view, with one end in section, of various types of electric wire conduits having protective sheaths as contemplated by the present invention.

Referring now to the drawings, the reference character A designates generally a conduit body of relatively long and narrow proportions forming a strip-like structure. The body is conveniently formed of a flexible fabric such as leather, paper, imitation leather or the like, a strip of which is folded upon itself and contains within its folds and along each outer longitudinal edge of the body an electric conducting wire 1 contained within an insulating jacket 2 which is preferably cylindrical. The jacket 2 and its wire 1 form along each edge of the body a bead 3, the two beads being separated by a center area 4 which serves to space the wire-containing beads 3 apart. The covering fabric is conveniently held closely about the insulating jackets 2 to fix the form and location of the beads 3 by means of lines of stitching 5 which are disposed at the juncture of the center area 4 and each of the edge beads 3.

Received over each of the beads 3 is a metallic protective sheath 6 which conforms substantially in contour to the shape of the body beads 3, being therefore substantially cylindrical in the preferred embodiment shown in the drawings. The sheaths 6 are provided in pairs, one for each bead 3, and are devoid of any electrical connection, so that even if the wires 1 should both become electrically connected with their respective sheaths 6 no short circuit between the wires 1 would ordinarily result.

Each of the sheaths 6 is conveniently crimped or pinched to the edge portions of the center area 4 along the lines of stitching 5, for the purpose of securely holding the sheath in place upon the wire containing bead and to fix the several parts of the structure against relative movement and separation.

In Fig. 2 the structure of Fig. 1 is shown affixed to a support B by means of a tack or the like 7 passed through the center area 4 of the body and into the support. It will be observed by reference to Figs. 1 and 2 that the conduit is preferably manufactured in such a way that the plane of the center area 4 lies substantially midway between the planes of the top and bottom surfaces of the beads 3. In other words the center portion 4, before the body is attached to a support, connects inwardly directed radii of the beads 3. When, however, the center area 4 is depressed by tacks or the like 7 by which it is secured to a support, each of the beads 3 rocks with relation to the center area so that the center area becomes tangent to the beads and the slots defined by the free edges of the sheaths 6 are moved to the lower portion of the beads and are concealed by the beads. This feature, it is believed, will be evident from a comparison of Figs. 1 and 2.

Figs. 3 and 4 illustrate a slight modification of the invention which includes a relatively large bead 8 hinged to one of the beads 3 and the adjacent edge of the center area 4. The bead 8, it will be observed, is adapted to be lifted from the area 4 for the purpose of permitting tacks 7 to be inserted through the area 4, after which the bead 8 is adapted to be depressed and to remain in engagement with the tack-receiving area 4 to cover and conceal the tack heads.

Fig. 5 illustrates a further modification in which a relatively large bead 9 is formed in the area of the body between the beads 3, which bead 9 is not hinged and therefore incapable of movement with relation to the beads 3. The body of Fig. 5 is adapted to be secured to the support B by agency of relatively long nails 10 passed through the bead 9.

The advantages of the blind nailing structure of Figs. 3 and 4 will be readily appreciated. The modification of Fig. 5 may be manufactured at slightly lower cost than the blind nail bodies, and possesses over the type of body shown in Figs. 1 and 2 the advantage of greater stiffness, firmness, and assurance that the edge beads 3 cannot be moved toward each other or lifted to any appreciable extent from the surface of the base B.

In each of the forms of the invention shown on the drawings I prefer to dispose the meeting edges of the fabric covering along a line removed from the midportion of the center area 4, so that the material of the center portion 4 will not be weakened along the line through which the tacks 7 are passed.

While I have shown and described, for purposes of exemplification of the invention, only straightaway lengths of conduit, it will be appreciated that the conduit may be provided in curved, bent, or other irregular sections, for the purpose of accommodating those portions of an installation which must be disposed around and into the corners of a room.

It will also be evident that while I have shown and described the present invention in certain preferred forms of embodiment the invention is by no means to be limited thereto. Other and further modifications will readily suggest themselves to persons skilled in the art, and all such modifications, to the extent that they embody the principles of the invention as pointed out in the appended claims are to be deemed within the scope and purview thereof.

Having thus described my present invention what I claim and desire to secure by Letters Patent is:

1. An electric wire conduit including a relatively long and narrow body formed of non-conducting material having an electric wire contained within each of its longitudinal edges, in combination with two independent and electrically unconnected metallic protective sheaths carried over said edges, one over each.

2. An electric wire conduit including a fabric folded upon itself and forming a strip, beads formed at the opposite longitudinal edges of the strip, an electric-conducting wire contained in each of said beads, and a separate metallic protective sheath received over each of the beads.

3. An electric wire conduit including a relatively long and narrow body formed of non-conducting material, substantially tubular longitudinal edge beads formed on the body, an electric-conducting wire contained within each of the beads, in combination with two independent and electrically unconnected metallic protective sheaths carried over said beads, one over each.

4. An electric wire conduit including a relatively long and narrow body formed of non-conducting material, substantially tubular longitudinal edge beads formed on the body, an electric-conducting wire contained within each of the beads, in combination with metallic protective sheaths crimped over said beads, one over each, said sheaths being electrically unconnected.

5. An electric wire conduit including a relatively long and narrow body formed of non-conducting material having a center wire-spacing area, substantially tubular longitudinal edge beads formed on the body and connected to the center area by relatively thin portions of the body, an electric-conducting wire contained within each of the beads, in combination with substantially tubular metallic protective sheaths carried by said beads, one by each, said sheaths being electrically unconnected, each of the relatively thin portions of the body connecting the beads with the body being crimped or pinched by the free edges of one of the protective sheaths.

6. An electric wire conduit including a relatively long and narrow body having a center tacking area and longitudinal edge beads, the bottom surfaces of the beads normally lying below the plane of the bottom surface of the center area, an electric wire contained within each of the beads, a slotted tubular protective sheath enclosing each of the beads, the edges defining the slot being crimped into the outer margins of the center area, said beads being adapted to rock with relation to the center area when said center area is depressed to the plane of the bottom surfaces of the beads by tacks passed through the center area and into a support, whereby said slots are moved to the lower portion of the beads and concealed thereby.

7. An electric wire conduit as claimed in claim 1, including an area between the edge beads adapted to receive tacks for fastening the conduit to a support and a flap hinged with relation to said area and adapted to overlie and conceal the fastening tacks.

8. An electric wire conduit as claimed in claim 1, including an area between the edge beads adapted to receive tacks for fastening the conduit to a support and a relatively large bead hinged to one of the wire-containing beads adapted normally to overlie and conceal the tack-receiving area of the body and capable of being lifted therefrom to permit tacks to be passed through said area.

In testimony whereof I affix my signature.

ERNEST G. ROMEISER.